(12) United States Patent
Burkhart et al.

(10) Patent No.: US 8,276,144 B2
(45) Date of Patent: Sep. 25, 2012

(54) ELECTRONIC DEVICE WORKSPACE RESTRICTION

(75) Inventors: Michael J. Burkhart, Cedar Park, TX (US); Vitaly V. Marin, Atlanta, GA (US); Eduardo L. Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 12/103,641

(22) Filed: Apr. 15, 2008

(65) Prior Publication Data

US 2009/0260010 A1 Oct. 15, 2009

(51) Int. Cl.
G06F 9/46 (2006.01)
G06F 3/048 (2006.01)

(52) U.S. Cl. ......... 718/102; 715/764; 715/767; 715/802

(58) Field of Classification Search .................. 718/102
See application file for complete search history.

(56) References Cited

U.S. PATENT DOCUMENTS

| | | | | |
|---|---|---|---|---|
| 5,107,443 | A * | 4/1992 | Smith et al. | 715/751 |
| 5,499,040 | A * | 3/1996 | McLaughlin et al. | 715/823 |
| 7,111,044 | B2 | 9/2006 | Lee | |
| 7,197,638 | B1 * | 3/2007 | Grawrock et al. | 713/165 |
| 7,356,775 | B2 * | 4/2008 | Ruelle et al. | 715/802 |
| 7,577,918 | B2 * | 8/2009 | Lindsay | 715/781 |
| 7,743,336 | B2 * | 6/2010 | Louch et al. | 715/766 |
| 7,765,143 | B1 * | 7/2010 | West | 705/37 |
| 7,865,839 | B2 * | 1/2011 | Heikes et al. | 715/805 |
| 2003/0105816 | A1 | 6/2003 | Goswami | |
| 2004/0207663 | A1 * | 10/2004 | Asakura | 345/781 |
| 2005/0052458 | A1 * | 3/2005 | Lambert | 345/440 |
| 2005/0055405 | A1 | 3/2005 | Kaminsky et al. | |
| 2005/0055412 | A1 * | 3/2005 | Kaminsky et al. | 709/207 |
| 2005/0154935 | A1 * | 7/2005 | Jin | 713/324 |
| 2006/0010397 | A1 | 1/2006 | Laffey | |
| 2006/0224991 | A1 * | 10/2006 | Stabb et al. | 715/781 |
| 2007/0162779 | A1 * | 7/2007 | Downer et al. | 713/340 |
| 2007/0180028 | A1 | 8/2007 | Chen et al. | |
| 2008/0034435 | A1 * | 2/2008 | Grabarnik et al. | 726/25 |
| 2008/0080677 | A1 * | 4/2008 | Samdadiya et al. | 379/67.1 |
| 2009/0125850 | A1 * | 5/2009 | Karstens | 715/866 |
| 2009/0260062 | A1 | 10/2009 | Burkhart et al. | |
| 2011/0029105 | A1 * | 2/2011 | Griffith et al. | 700/94 |

OTHER PUBLICATIONS

Tran et al., "Supporting Awareness in Instant Messaging: An EMpirical Study and Mechanism Design," Proceedings of OZCHI 2005, Nov. 23-25, 2005. Section 4.1).*

"U.S. Appl. No. 12/103,544 Office Action", Jan. 14, 2011, 15 pages.

(Continued)

*Primary Examiner* — Lewis A Bullock, Jr.
*Assistant Examiner* — Kevin X Lu
(74) *Attorney, Agent, or Firm* — DeLizio Gilliam, PLLC

(57) ABSTRACT

The drive for multi-tasking and/or availability of numerous applications can interfere with productivity. Constant interruptions from email and real-time online communication can lead to decreased productivity. In addition, attempting to tackle a massive number of different projects with different applications can impede progress on any one of the projects. Functionality can be implemented in a workspace to focus interaction with one or more applications in the workspace. Focused interaction allows a user to limit distractions (e.g., email notifications, instant message notifications, etc) and restrict activities not related to his or her current task.

18 Claims, 8 Drawing Sheets

OTHER PUBLICATIONS

Tran, Minh Hong "Supporting Awareness in Instant Messaging: An Empirical Study and Mechanism Design", *Proceedings of OZCHI 2005* http://eprints.vu.edu.au/560/1/OZCHI2005__1p9.pdf (Obtained from the Internet on Jan. 21, 2011) Nov. 23-25, 2005, 10 pages.

"U.S. Appl. No. 12/103,544 Final Office Action", May 13, 2011, 18 pages.

Dunn, Scott "Windows Tips: Vanquish Still More Windows Annoyances", http://www.pcworld.com//printable/article/id,127062/printable.html,(Sep. 25, 2006).

\* cited by examiner

ELECTRONIC DEVICE WORKSPACE RESTRICTION

BACKGROUND

Embodiments of the inventive subject matter generally relate to the field of computers, and, more particularly, to managing workspace.

Computers and software have greatly contributed to improving productivity and allowing multi-tasking. These tools allow people to accomplish many tasks more efficiently in the past. Within a single workspace, a user can respond to instant messages, prepare an e-mail message, schedule meetings on a calendar, and prepare a report concurrently.

SUMMARY

Embodiments include a method directed to determining that a restricted activity state is to be imposed on an electronic device workspace based, at least in part, on an application related activity. The electronic device workspace is restricted to a first set of one or more applications that correspond to the application related activity. A second set of one or more applications is prevented from intruding into the electronic device workspace during the restricted activity state.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to real-time online communication applications, embodiments can be implemented in short message service applications (SMS). In other instances, well-known instruction instances, protocols, structures and techniques have not been shown in detail in order not to obfuscate the description.

Everyday many people use real-time online communication applications (IBM® Sametime, Yahoo!® messenger, MSN® messenger, etc.) in business communications. Even though instant message communications can be sent via a secure channel, users can accidentally send instant messages to unintended recipients by typing or pasting text and images into the wrong instant message chat window. This can lead to unintended information security failures. Implementing functionality to prioritize chat windows within a real-time online communication application reduces the likelihood of sending messages to incorrect recipients.

Figure 1:
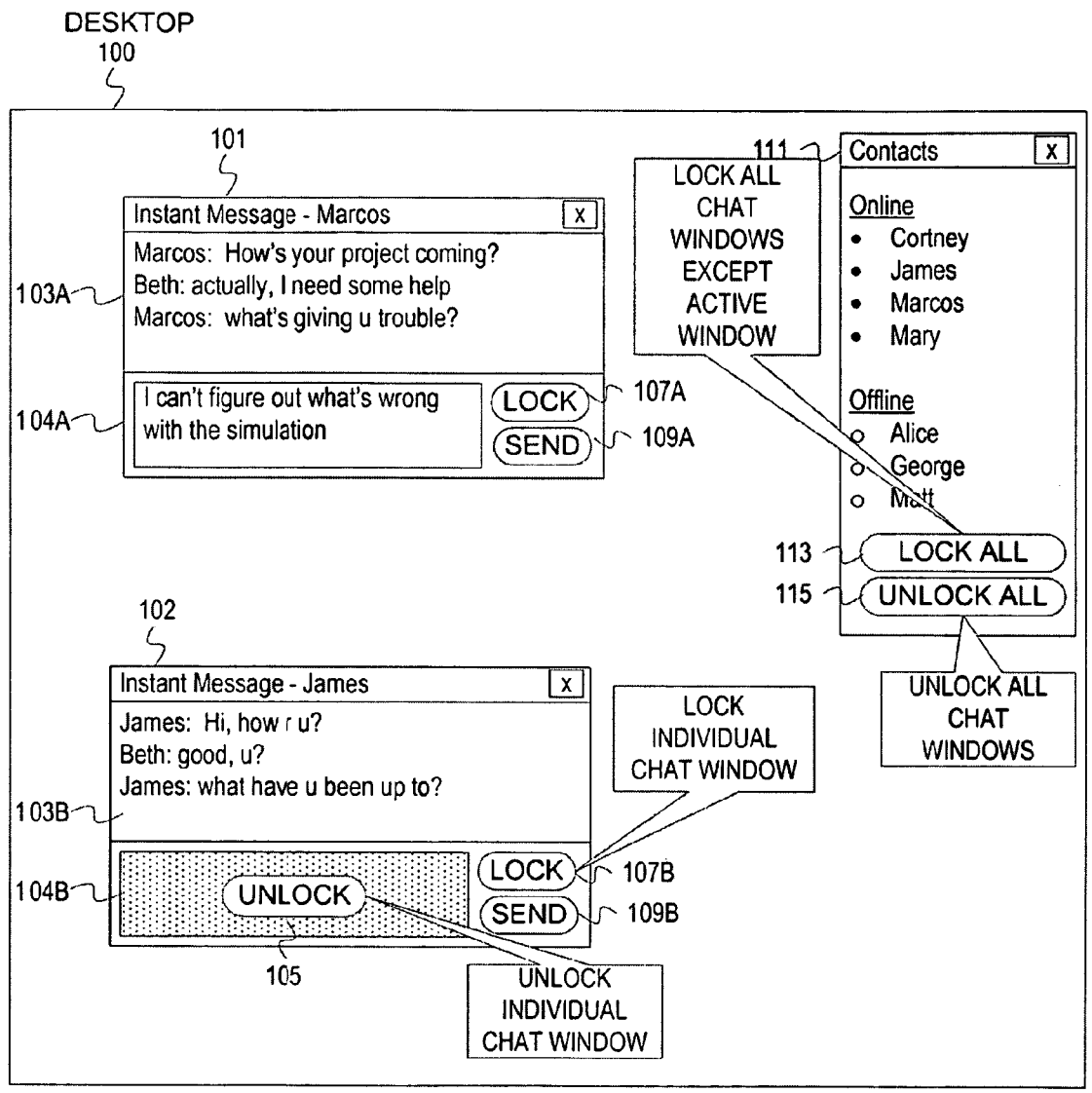
FIG. 1 depicts an example of instant message locking.

FIG. 1 depicts an example of instant message locking. A computer desktop 100 hosts two instant message chat windows 101 and 102 and an instant message contacts window 111. The instant message chat window 101 includes a chat conversation area 103A, an outgoing text input area 104A, a lock button 107A, and a send button 109A. Similarly, the instant message chat window 102 includes a chat conversation area 103B, an outgoing text input area 104B, a lock button 107B, and a send button 109B. The instant message contacts window 111 has a lock all button 113 and an unlock all button 115.

The instant message chat window 101 is the active window and is unlocked. Instant messages can be sent or received in an unlocked chat window. The instant message chat window 102 is locked. Instant messages cannot be sent in a locked chat window. The outgoing input text area 104B of instant message chat window 102 is restricted and contains an unlock button 105. In addition, the lock button 107B and the send button 109B are disabled. Although not depicted in FIG. 1, the buttons 107B and 109B can also be manipulated graphically to indicate the disabled functionality (e.g., greyed out, removed, made transparent, etc.). The unlock button 105 unlocks the outgoing text input area 104B.

The lock all button 113 locks all chat windows except the active chat window, which is the instant message chat window 101 in this illustration. The active chat window is the last window from which an instant message was sent. The unlock all button 115 unlocks all chat windows.

One or more instant message chat windows can be locked or unlocked at a time. As an example, a user may have four instant message chat windows open on the desktop. The user may wish to interact (e.g., send outgoing messages) with only three of the four windows. The user clicks a lock button on the chat window he or she does not want to interact with. As another example, the user may wish to interact with two of the four open chat windows. The user clicks the lock all button, leaving the chat window with the latest sent message open. Then the user clicks on an unlock button of the second chat window of interest to interact with the second chat window.

Embodiments may utilize an automatic locking mechanism that locks and/or closes chat windows after indicated time thresholds have been reached since the last sent message. Default values can be assigned to the time thresholds or the thresholds can be set by a user. For example, a user may wish to lock chat windows when five minutes have elapsed since the last sent message and close chat windows when thirty minutes has elapsed since the last sent message.

Figure 2:
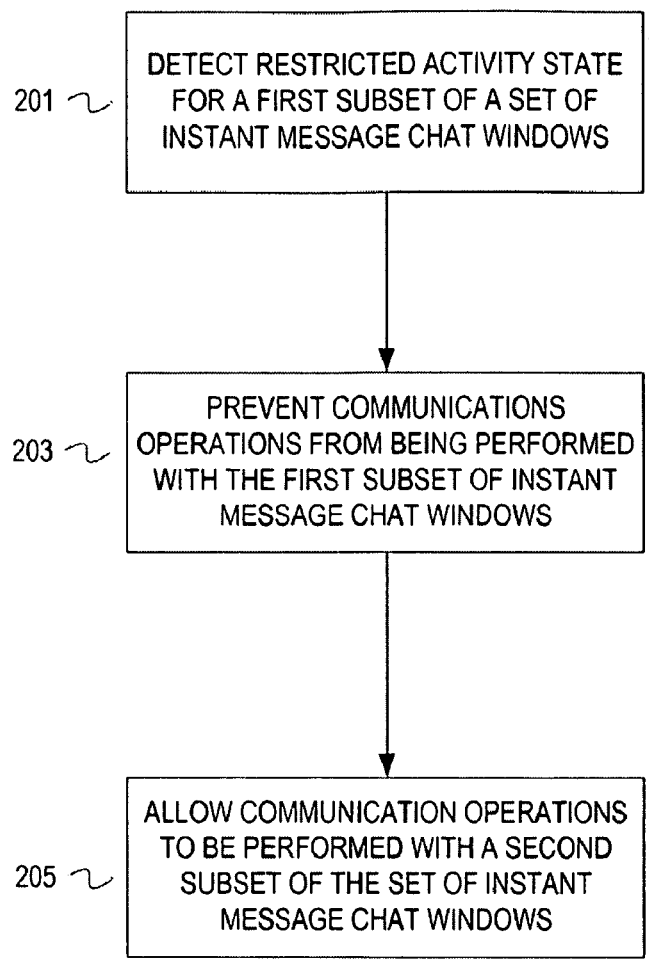
FIG. 2 depicts a flowchart of example operations for instant message locking.

FIG. 2 depicts a flowchart of example operations for instant message locking. Flow begins at block 201, where a restricted activity state for a first subset of instant message chat windows is detected. Examples of detection of a restricted activity state include manual locking of one or more windows by a user, automatic locking of one or more windows after a certain time threshold has been reached since the last sent message, automatic locking of chat windows that do not involve a particular contact, etc.

At block 203, performance of communication operations is prevented with the first subset of instant message chat windows. Communication operations include sending a text message, sending a graphical image, transferring an electronic file, etc. Examples of preventing performance of communications are preventing text entry in the outgoing text area of the first subset of instant message chat windows, closing the first subset of instant message chat windows, minimizing and preventing restore of the first subset of instant message chat windows, etc. In one example, outgoing messages are disallowed, while incoming messages are received and immediately displayed on the screen. In another example, outgoing messages are disabled and display of incoming messages is delayed until the end of the restricted activity state. Users can set configurations for receiving new instant messages during the restricted activity state. For example, new instant message chat windows may open in the background (i.e., behind one or more unlocked chat windows) or new instant message chat windows may open at the end of the restricted activity state.

At block 205, performance of communication operations is allowed with a second subset of instant message chat windows.

Figure 3:
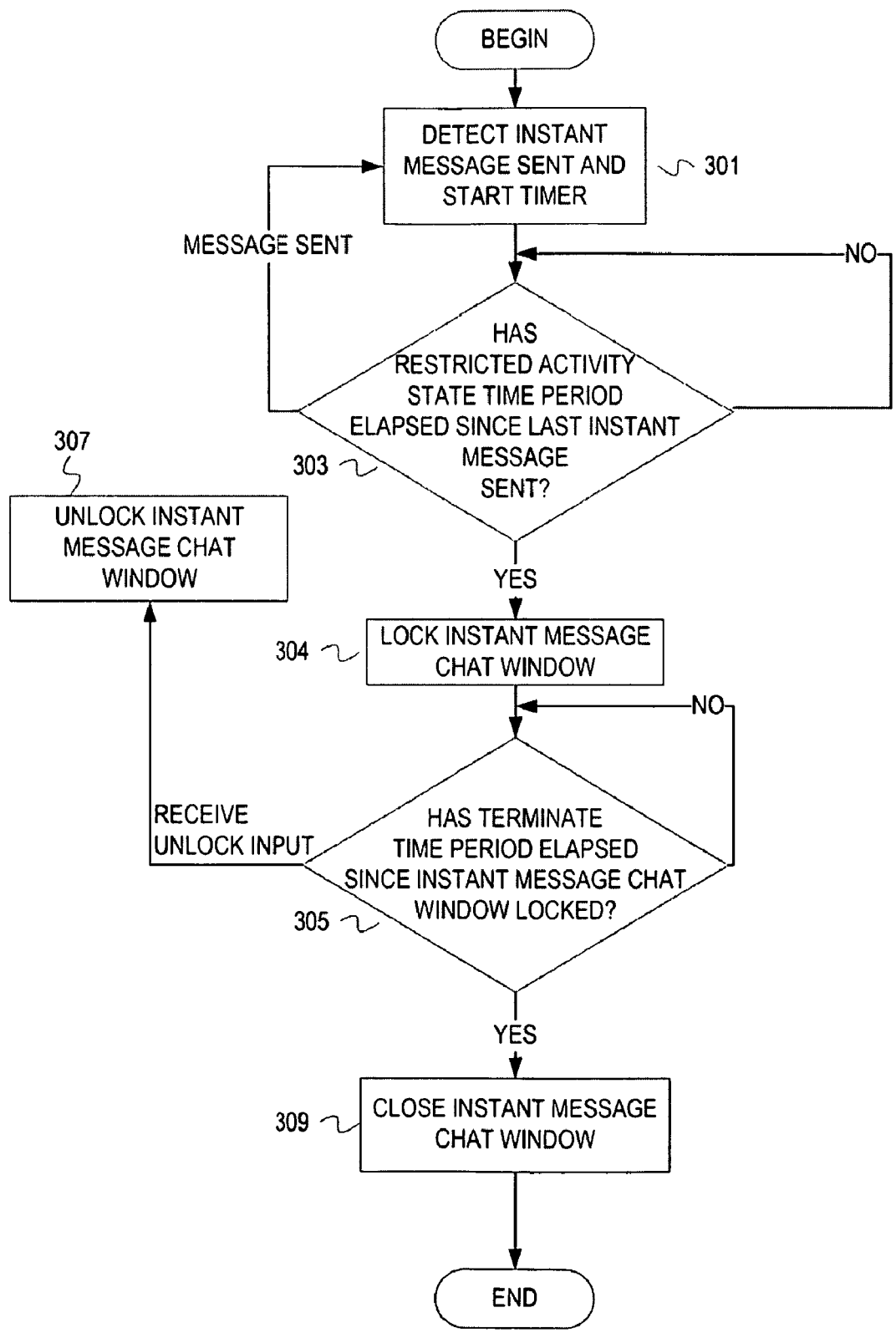
FIG. 3 depicts a flowchart of example operations for automatically locking instant message chat windows.

FIG. 3 depicts a flowchart of example operations for automatically locking instant message chat windows. Flow begins at block 301, where a sending of an instant message is detected and a timer is started. An instant message may include text, a graphical image, an electronic file, etc.

At block 303, it is determined if a restricted activity time period has elapsed since the last instant message sent. The restricted activity time period can be a default value or can be set by a user. If another instant message is sent, flow continues at block 301. If the restricted time period has elapsed, flow continues at block 304. If the restricted time period has not elapsed, flow continues at block 303.

At block 304, the instant message chat window is locked.

At block 305, it is determined if a terminate time period has elapsed since the instant message chat window was locked. The terminate time period can be a default value or can be set by a user. If unlock input is received, flow continues at block 307. Examples of unlock input include manual selection of an unlock button, a particular contact (e.g., manager, CEO, etc.) sends an instant message, etc. For instance, it may be defined, perhaps in a policy for the real-time online communication application, that regardless of current state of the workspace or desktop a message from a contact with manager in their title will be permitted to open a new chat window and override locks. If the terminate time period has elapsed, flow continues at block 309. If the terminate time period has not elapsed, flow continues at block 305.

At block 307, the instant message chat window is unlocked.

At block 309, the instant message chat window is closed.

Locking schemes for real-time online communication applications can be extended to one or more workspaces in which one or more different applications may be running. The drive for multi-tasking and/or availability of numerous applications can interfere with productivity. Constant interruptions from email and real-time online communication can lead to decreased productivity. In addition, attempting to tackle a massive number of different projects with different applications can impede progress on any one of the projects. Functionality can be implemented in a workspace to focus interaction with one or more applications in the workspace. Focused interaction allows a user to limit distractions (e.g., email notifications, instant message notifications, etc) and restrict activities not related to his or her current task.

Figure 4:
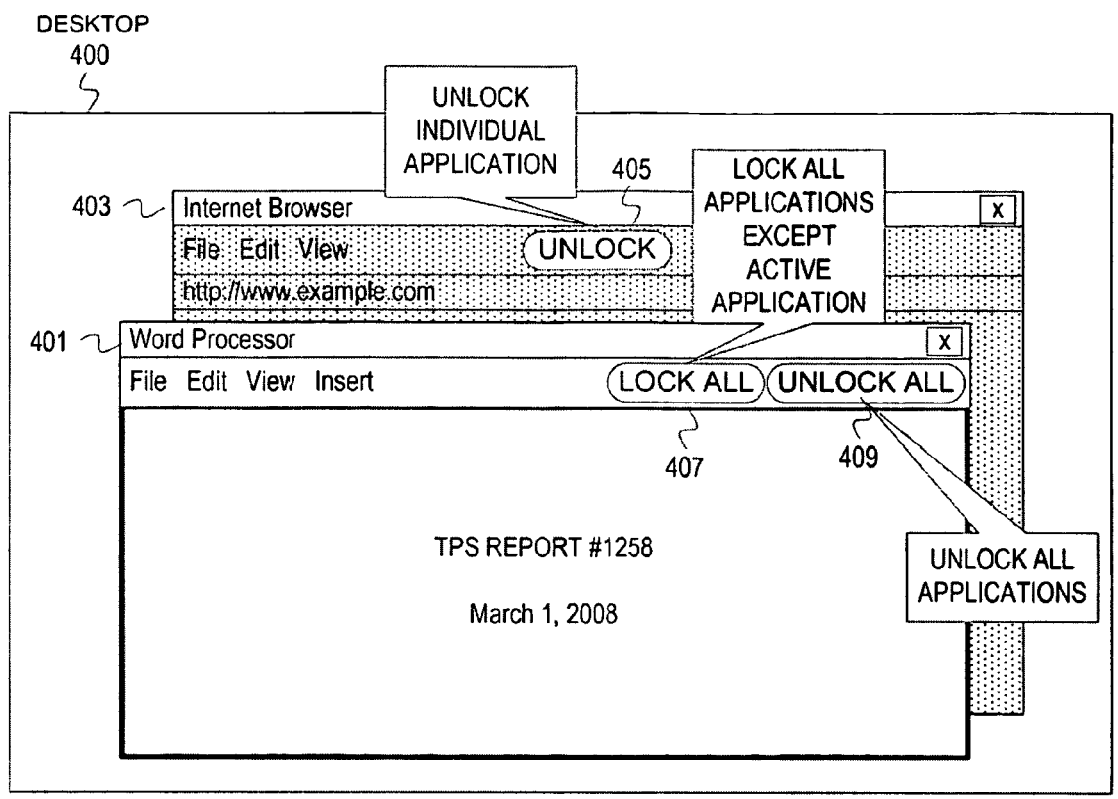
FIG. 4 depicts an example of workspace locking.

FIG. 4 depicts an example of workspace locking. A computer desktop 400 hosts a word processor window 401 and an Internet browser window 403. The word processor window 401 has a lock all button 407 and an unlock all button 409. The internet browser window 403 has an unlock button 405. Embodiments may display interface objects differently when applications are in different locking states. For example, when an application is locked, a lock button may disappear or be grayed out. As another example, a lock all button may be disabled if all applications except the current one are locked.

The word processor window 401 is the active window and is unlocked. Application functionality is accessible in an unlocked window. For example, a user can create a new document; edit an existing document, etc. The Internet browser window 403 is locked. Application functionality is not accessible in a locked window. For example, a user cannot browse to a new webpage; click on a link on a webpage, etc. The Internet browser window 403 is restricted and contains an unlock button 405. The unlock button unlocks the functionality of the application.

The lock all button 407 locks all application windows except the active application window. The active application window is the window with which a user is currently interacting. Examples of locking of applications includes minimizing and preventing restore of applications, restriction of starting new applications, turning off application notifications (e.g., email receive notification, instant message notifications, etc.), etc. The unlock all button 409 unlocks all application windows.

One or more application windows can be locked or unlocked at a time. As an example, a user may be working on a report in a word processor application that is a member of a restricted workspace. The user may want to include some data from a spreadsheet. The spreadsheet can be opened in the restricted workspace so that the word processor application remains unlocked. In some embodiments, new applications may be manually opened in the restricted workspace in response to a user action (e.g., clicking a button, selecting an option from a drop down menu, etc). In other embodiments, new applications may be automatically opened in the restricted workspace based on user configurations and/or past usage behavior (e.g., previously opened applications, previously opened documents, etc). Restricted workspace configurations may include options for the types of applications that can be opened, the number of applications that can be opened, etc. Embodiments may utilize an automatic locking mechanism that locks and/or closes other application windows after indicated time thresholds have been reached during exclusive use of a certain application. Default values can be assigned to the time thresholds or the thresholds can be set by a user or an administrator. For example, a user may wish to lock other applications when he or she has been continuously working on a document in a word processor for twenty minutes.

In addition, more than one workspace may be running on a computer system. Application locking can be applied to lock down individual applications within the individual workspaces. As an example, a user may have defined two workspaces, one for business activities and one for personal activities. The locking system can prevent the user from opening personal email in the business workspace and business email in the personal workspace. Instant message windows can also be controlled by application locking within multiple workspaces. For example, instant messages for business contacts are opened in a business workspace and instant messages from friends and family are opened in a personal workspace. A locking mechanism can also be applied across the different workspaces. When a restricted activity state is entered in one workspace, other workspaces cannot be accessed.

Figure 5:
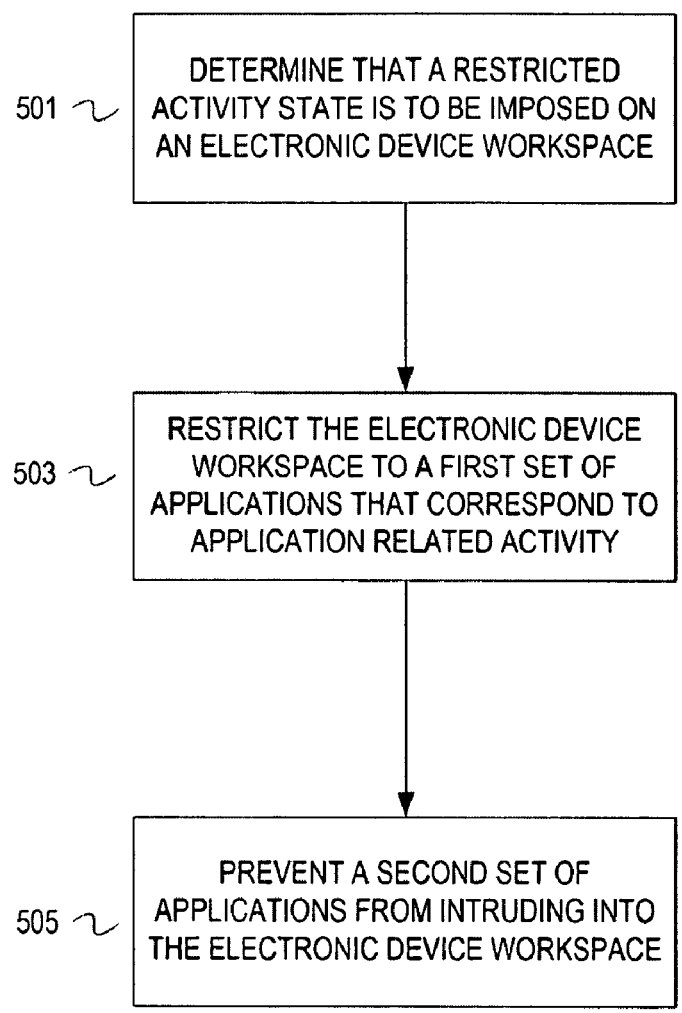
FIG. 5 depicts a flowchart of example operations for locking applications.

FIG. 5 depicts a flowchart of example operations for locking applications. Flow begins at block 501, where it is determined that a restricted activity state is to be imposed on an electronic device workspace based, at least in part, on application related activity. Examples of determining that a restricted activity state should be imposed include manual locking of one or more applications by a user, automatic locking of one or more applications after exclusive activity in an application is detected for a certain period of time, etc.

At block 503, the electronic workspace is restricted to a first set of one or more applications that correspond to the application related activity. Examples of application related activities include accumulation of a time period of a user working with the first set of one or more applications, expiration of a lack of activity time period for the second set of one or more applications, and an activity to launch one of the first set of applications, etc.

At block 505, a second set of one or more applications is prevented from intruding into the electronic device workspace during the restricted activity state. Examples of preventing applications from intruding the workspace during a restricted activity state include minimizing the second set of, closing the second set of applications, disabling notification functionality of the second set of applications, etc.

Figure 6:
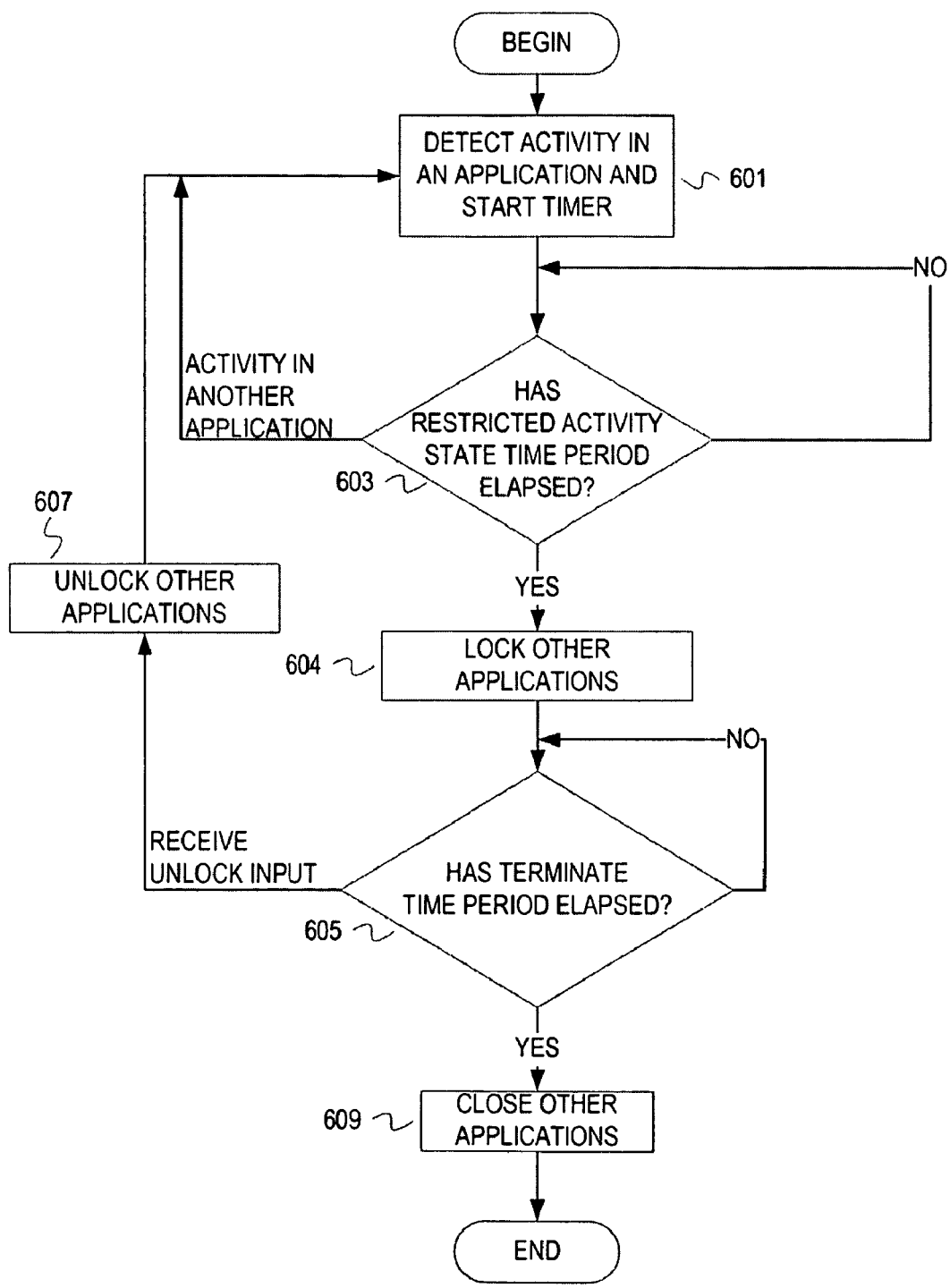
FIG. 6 depicts a flowchart of example operations for automatically locking application windows.

FIG. 6 depicts a flowchart of example operations for automatically locking application windows. Flow begins at block 601, where activity in an application is detected and a timer is started. Examples of activity in an application are typing a document in a word processor, entering data into a spreadsheet, composing an email, etc.

At block 603, it is determined if a restricted activity state time period has elapsed. The restricted activity state time period can be a default value or can be set by a user. If activity is detected in another application, flow continues at block 601. If the restricted activity state time period has elapsed, flow continues at block 604. If the restricted activity state time period has not elapsed, flow continues at block 603.

At block 604, other application windows are locked. If multiple workspaces are available, switching between workspaces may be restricted.

At block 605, it is determined if a terminate time period has elapsed since the other application windows were locked. The terminate time period can be a default value or can be set by a user. If unlock input is received, flow continues at block 607. If the terminate time period has elapsed, flow continues at block 609. If the terminate time period has not elapsed, flow continues at block 605.

At block 607, the other application windows are unlocked.

At block 609, the other application windows are closed or minimized. State and/or data of the applications minimized or closed is saved.

A restricted activity state can be imposed on workspaces based on more than time thresholds. A restricted activity state can be imposed on workspaces based on one or more policies that govern the workspace, in addition to or in conjunction with time thresholds. A user and/or administrator can define one or more policies that impose a restricted activity state on a workspace to allow the user to focus on specific tasks within the workspace. For example, an administrator can define a policy that restricts a workspace to applications A and B if application A is opened. In some embodiments, an administrator can define policies and associate the policies with particular tasks. For instance, a user can be presented with a menu of tasks. When the user selects a task from the menu of tasks, the one or more policies associated with that task are used to govern the workspace. For example, a policy may be associated with a prepare financial reports task. An administrator can define the policy to allow use of an accounting application, a spreadsheet application, and a calculator application in the workspace. The administrator can also define the policy to allow a word processing application to be opened for creation of a document, but only with an accounting report template and disallow the drawing functionality of the word processing application. Policies can also be defined to restrict switching between multiple workspaces.

Figure 7:
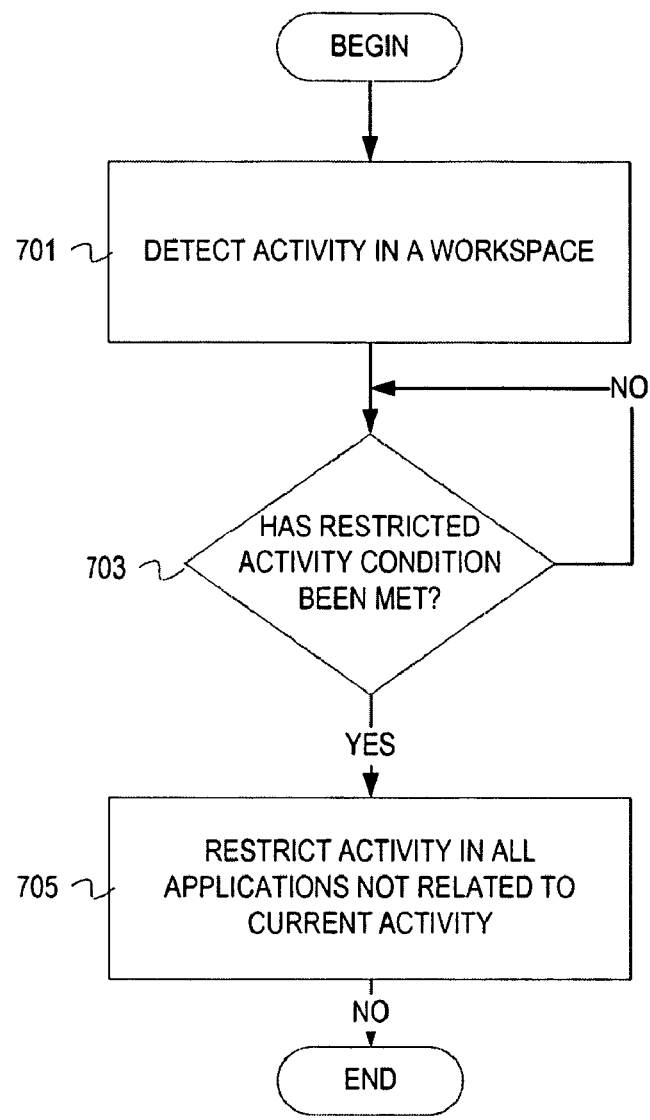
FIG. 7 is a flowchart depicting example operations for imposing a restricted activity state on a workspace based on a policy.

FIG. 7 is a flowchart depicting example operations for imposing a restricted activity state on a workspace based on a policy. Flow begins at block 701, where activity is detected in a workspace. Examples of activity in a workspace include selecting a command to open a word processor document, clicking on an icon to open a word processor application, pressing keys to create a spreadsheet, clicking on a link to join a web-meeting, etc. At block 702, a policy that governs the workspace is accessed. For example, when a request to open an application is detected, a corresponding one or more policies is accessed.

At block 703, it is determined if the policy indicates that a restricted activity state is to be imposed on the workspace. For example, the accessed policy may indicate that the workspace should be restricted to an e-mail application and a word processing application when an e-mail is received from a particular sender during certain hours of the day. If the policy indicates that the restricted activity state is to be imposed, then control flows to block 705. Otherwise, the flow ends.

At block 705, the restricted activity state is imposed. For example, a process that accessed the policy and monitors the workspace minimizes all applications except those allowed applications according to the policy. For example, the process may minimize all applications not related to media editing when a user has been working with a video editing application for more than a given number of minutes. In another example, an administrator defines a policy that restricts workspace use when a web based meeting is active in the workspace. Many companies use web based meetings because employees are spread out in different locations across the country. Employees may multi-task during the meeting and miss critical information. The policy can be used to impose a restricted activity state while the web based meeting is being conducted to prevent participants from being distracted by other applications, such as their e-mail application, a browser, etc. A policy can also be defined to impose a restricted activity state to protect the security of a business. The policy can be defined to disallow use of an e-mail application while the user views certain documents.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, in some embodiments, functionality may not be implemented to close instant message chat windows after a certain period of time has elapsed since the last sent message.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
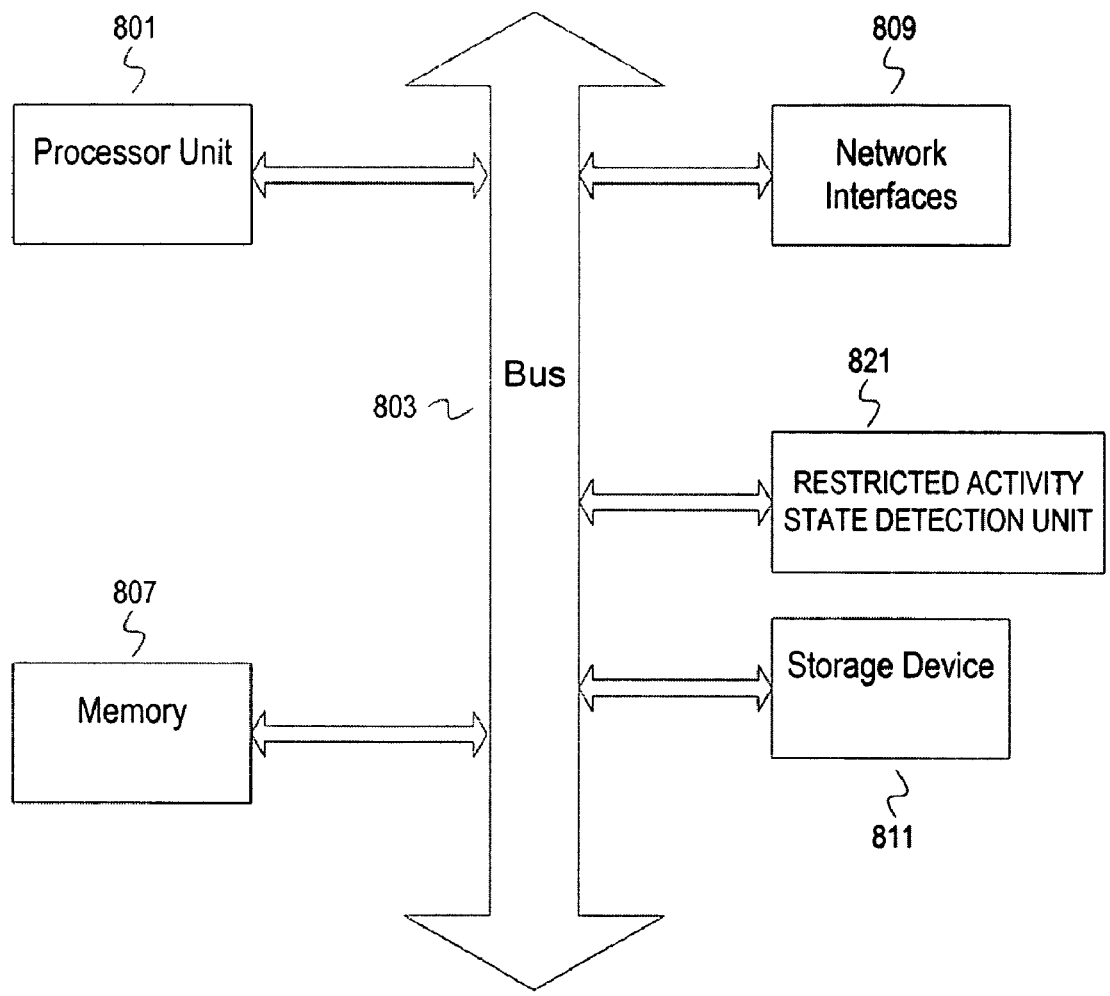
FIG. 8 depicts an example computer system.

FIG. 8 depicts an example computer system. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 809 (e.g., an ATM interface, an Ethernet interface, a Frame Relay interface, SONET interface, wireless interface, etc.), and a storage device(s) 811 (e.g., optical storage, magnetic storage, etc.). A restricted activity state management unit 821 performs the functionality described herein. The restricted activity state management unit 821 and detects a restricted activity state for a real-time online communication application and manages access of instant message chat windows during the restricted activity state. Any one of the functionalities described above may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 811, and the network interface 809 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving an indication of a first of a plurality of tasks;
   accessing a policy associated with the first of the plurality of tasks;
   determining that a restricted activity state is to be imposed on an electronic device workspace based, on the policy that is associated with the first of the plurality of tasks and an application related activity, wherein the restricted activity state imposes use of a first set of one or more applications on the electronic device and preventing use of a second set of one or more applications on the electronic device, wherein the application related activity comprises:
      accumulation of a first time period of a user working with the first set of one or more applications,
      expiration of a lack of activity second time period for the second set of one or more applications,
      a first activity to launch one of the first set of applications,
      a second activity to close one of the second set of one or more applications, and
      activation of one or more lock controls of the second set of one or more applications;
   restricting the electronic device workspace to the first set of one or more applications that correspond to the application related activity and the policy; and
   preventing the second set of one or more applications from intruding into the electronic device workspace during the restricted activity state.

2. The method of claim 1, wherein said preventing comprises at least one of minimizing the second set of applications during the restricted activity state, closing the second set of applications, obscuring the second set of applications during the restricted activity state, and disabling notification functionality of the second set of applications during the restricted activity state.

3. The method of claim 2 further comprising saving state of the second set of applications.

4. The method of claim 1 further comprising terminating the restricted activity state.

5. The method of claim 4, wherein said terminating comprises at least one of activation of an unlock control associated with the electronic device workspace, activation of an unlock control associated with at least one of the first set of applications, a change in governing policy, completion of a task, and closing of the first set of applications.

6. One or more computer storage having stored therein a program product, which when executed a set of one or more processor units causes the set of one or more processor units to perform operations that comprise:

receiving an indication of a first of a plurality of tasks;

accessing a policy associated with the first of the plurality of tasks;

determining that a restricted activity state is to be imposed on an electronic device workspace based on the policy that is associated with the first of the plurality of tasks and an application related activity, wherein the restricted activity state imposes use of a first set of one or more applications on the electronic device and preventing use of a second set of one or more applications on the electronic device, wherein the application related activity comprises:

accumulation of a first time period of a user working with the first set of one or more applications, expiration of a lack of activity second time period for the second set of one or more applications, a first activity to launch one of the first set of applications, a second activity to close one of the second set of one or more applications, and activation of one or more lock controls of the second set of one or more applications;

restricting the electronic device workspace to the first set of one or more applications that correspond to the application related activity and the policy; and preventing the second set of one or more applications from intruding into the electronic device workspace during the restricted activity state.

7. The computer storage of claim 6, wherein said preventing operation comprises at least one of minimizing the second set of applications during the restricted activity state, closing the second set of applications, obscuring the second set of applications during the restricted activity state, and disabling notification functionality of the second set of applications during the restricted activity state.

8. The computer storage of claim 7, wherein the operations further comprise saving state of the second set of applications.

9. The computer storage of claim 6, wherein the operations further comprise terminating the restricted activity state.

10. The computer storage of claim 9, wherein said terminating operation comprises at least one of activation of an unlock control associated with the electronic device workspace, activation of an unlock control associated with at least one of the first set of applications, a change in governing policy, completion of a task, and closing of the first set of applications.

11. An apparatus comprising:

a set of one or more processor units;

memory; and one or more machine-readable media having stored therein a program product, which when executed a set of one or more processor units causes the set of one or more processor units to perform operations that comprise, receiving an indication of a first of a plurality of tasks;

accessing a policy associated with the first of the plurality of tasks;

determining that a restricted activity state is to be imposed on an electronic device workspace based on the policy that is associated with the first of the plurality of tasks and an application related activity, wherein the restricted activity state imposes use of a first set of one or more applications on the electronic device and preventing use of a second set of one or more applications on the electronic device, wherein the application related activity comprises:

accumulation of a first time period of a user working with the first set of one or more applications, expiration of a lack of activity second time period for the second set of one or more applications, a first activity to launch one of the first set of applications, a second activity to close one of the second set of one or more applications, and activation of one or more lock controls of the second set of one or more applications;

restricting the electronic device workspace to the first set of one or more applications that correspond to the application related activity and the policy; and preventing the second set of one or more applications from intruding into the electronic device workspace during the restricted activity state.

12. The apparatus of claim 11 further comprising one or more input/output devices operable to display the first set of applications and operable to receive input that corresponds to the application related activity.

13. The method of claim 1, wherein the first of the plurality of tasks comprise a web based meeting, wherein the second set of one or more applications comprise any applications that distract participants of the web based meeting.

14. The method of claim 1, wherein the policy imposes the restricted activity state to protect a security of a business, wherein the first set of one or more applications comprise an application for document viewing, and wherein the second set of one or more applications comprise an e-mail application.

15. The one or more computer storage of claim 6, wherein the first of the plurality of tasks comprise a web based meeting, wherein the second set of one or more applications comprise any applications that distract participants of the web based meeting.

16. The one or more computer storage of claim 6, wherein the policy imposes the restricted activity state to protect a security of a business, wherein the first set of one or more applications comprise an application for document viewing, and wherein the second set of one or more applications comprise an e-mail application.

17. The apparatus of claim 11, wherein the first of the plurality of tasks comprise a web based meeting, wherein the second set of one or more applications comprise any applications that distract participants of the web based meeting.

18. The apparatus of claim 11, wherein the policy imposes the restricted activity state to protect a security of a business, wherein the first set of one or more applications comprise an application for document viewing, and wherein the second set of one or more applications comprise an e-mail application.

* * * * *